May 10, 1960     J. T. SCHWIEGER     2,935,994
HYDRAULIC DISPENSER

Filed March 9, 1959     3 Sheets-Sheet 1

JOHN T. SCHWIEGER
*INVENTOR.*

BY *Smith & Tuck*

May 10, 1960 J. T. SCHWIEGER 2,935,994
HYDRAULIC DISPENSER
Filed March 9, 1959 3 Sheets-Sheet 2

JOHN T. SCHWIEGER
*INVENTOR.*

BY
*Smith & Tuck*

May 10, 1960     J. T. SCHWIEGER     2,935,994
HYDRAULIC DISPENSER
Filed March 9, 1959     3 Sheets-Sheet 3
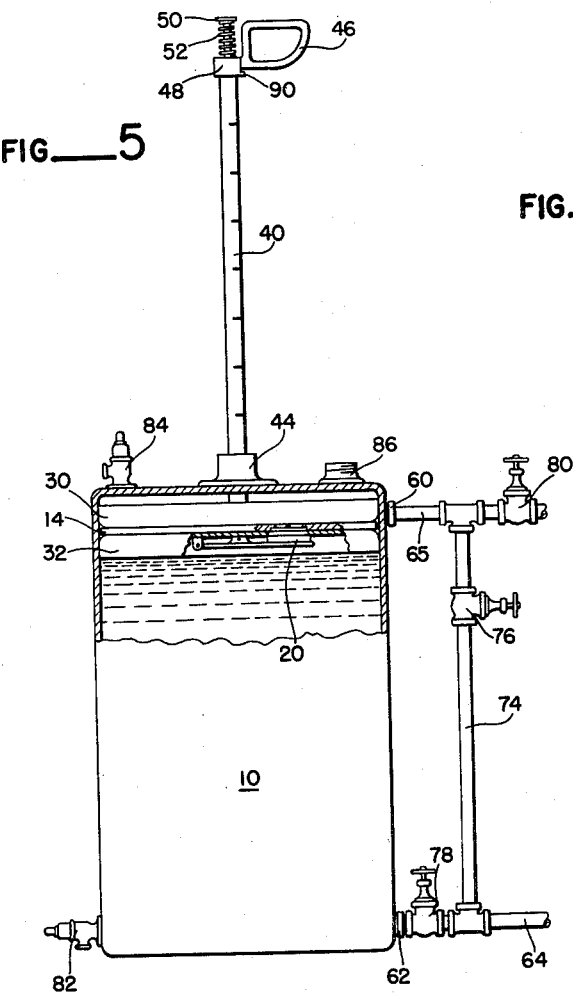
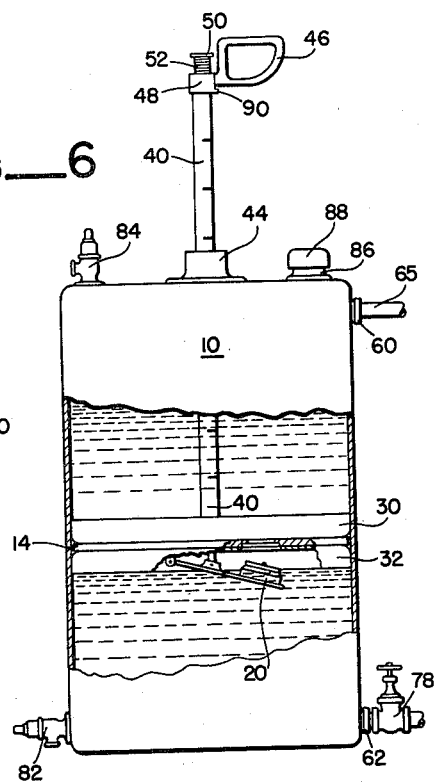
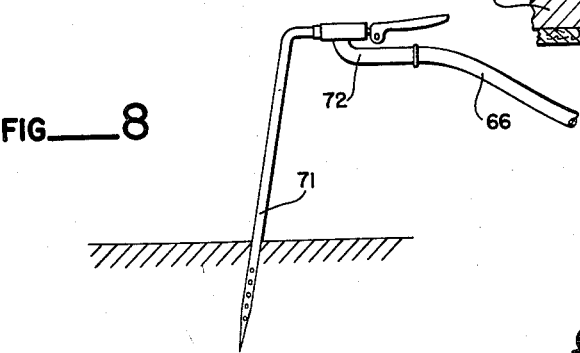
JOHN T. SCHWIEGER
*INVENTOR.*
BY Smith + Tuck

2,935,994

HYDRAULIC DISPENSER

John Thomas Schwieger, Auburn, Wash.

Application March 9, 1959, Serial No. 798,208

5 Claims. (Cl. 137—268)

This present invention relates to the general art of dispensers and more especially to a hydraulic dispenser in which a closed container having a reciprocating piston therein is used whereby water and various admixtures can be introduced above the piston and mixed in a predetermined proportion and the same may then be ejected from the dispenser by water introduced under pressures beneath the floating piston.

Many devices have provided for the dispensing of various water soluble materials and liquid concentrates such as fertilizer, plant foods, wettable powders, liquid soaps, weed killers, insecticides etc. using water under pressure and employing spray devices to distribute the fertilizing bearing water. The devices of this order that have been studied use means whereby the fertilizer is mixed with the water and siphoned into the main irrigating stream. It is very difficult to adjust devices of this order so that a definite amount of fertilizer is carried by a definite amount of water due largely to the relatively small amount of fertilizer used. As a result of this uncertainty, it is common to have a concentration of fertilizer that is damaging to the plants being treated or on the other hand the concentration may be so dilute as to be relatively ineffective. In this present invention, means are provided so that a definite amount of a suitable admixture can be combined with a definite amount of water and then this mixture can be used as the sole liquid or may be introduced into a stream of water with control valves and indicating means so conveniently arranged that the operator has the assurance of full control of the concentration of insecticides, fertilizer and the like deposited on the area of need.

The principal object of this invention is to provide a hydraulic insecticide or fertilizer dispenser, which is equipped with adequate means so that the concentration of water and admixture can be accurately determined and the same may then be employed over a controlled period of time.

A further object of this invention is to provide a dispensing container having a reciprocating piston therein wherein an admixture such as fertilizer is mixed with water on one side of the piston and then water is introduced under pressure on the opposite side of the piston to expel the mixed water and mixture.

A further object of this invention is to provide a compact dispensing arrangement with a unique valving means so that the operator has complete control over the dispenser throughout a wide range of operational conditions.

Further objects, advantages and capabilities will be apparent from the description and the disclosure in the drawings, or may be comprehended or are inherent in the device.

In the drawings:

Figure 5 is a vertical side view of my device with certain parts broken away and sectioned showing the piston in its upper position, which position is employed in the charging of my device.

Figure 6 is a side elevation partly in section, but illustrating the downward movement of the piston after the charging operation and showing the piston valve in its open position.

Figure 7 is a fragmentary elevation in section of a modified form of valve, which is desirable for certain of the smaller sizes of this dispenser.

Figure 8 is a side elevation of a subsurface irrigating device suitable for use with this dispenser.

Figures 1, 2:
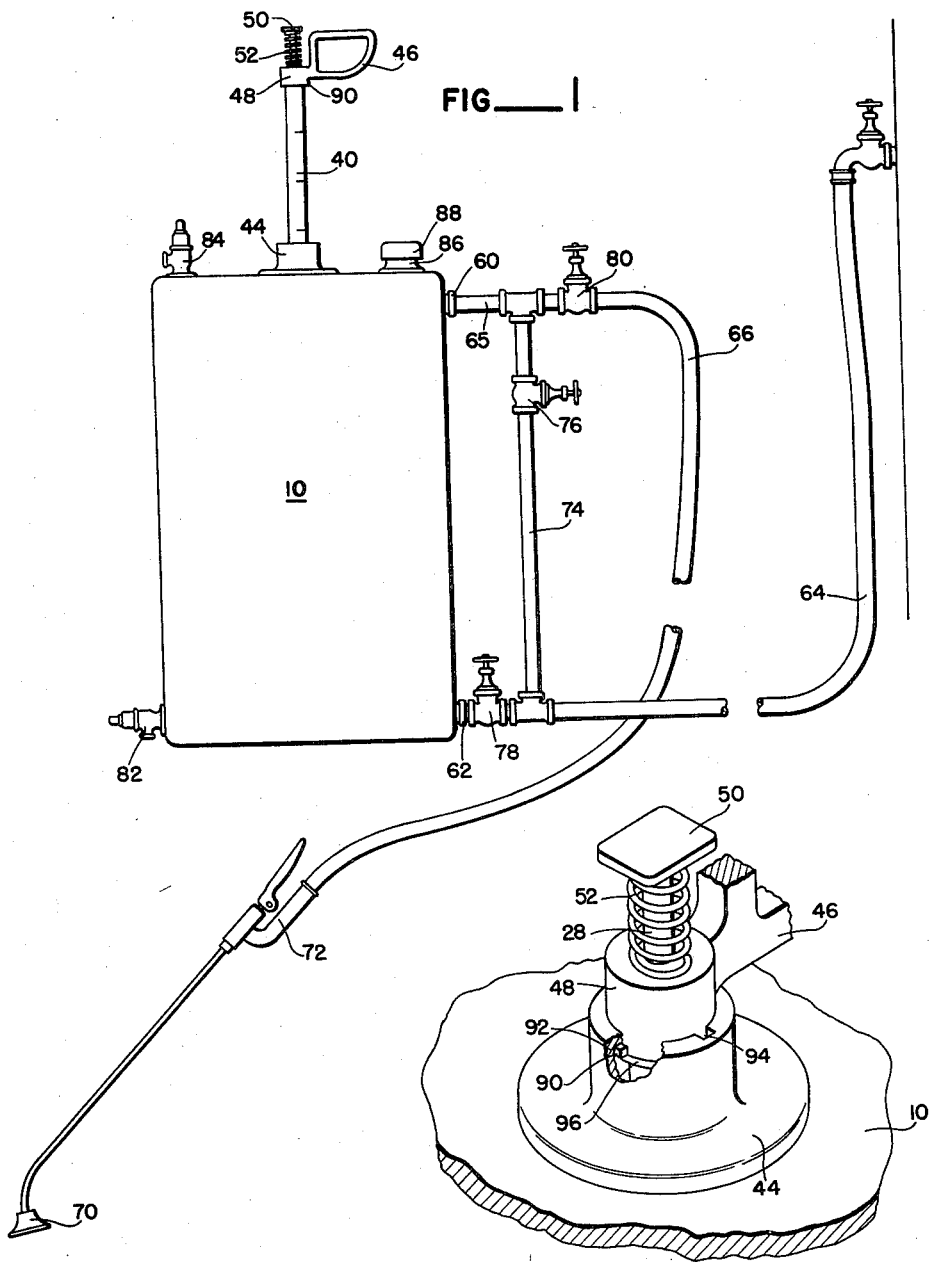
Figure 1 is a side elevation of my container showing the various piping and hose connections, which may be used to take fullest advantage of the novel arrangement provided.
Figure 2 is an enlarged perspective view of the handle and valve controlling means used in my device, portions being broken away and sectioned.

Referring more particularly to the disclosure in the drawings, numeral 10 designates the pressure container used with this equipment. The container must be substantially constructed in order to withstand the full water pressure, which may possibly be obtainable in various localities, and is provided with a cylindrical midbody portion so as to provide a working cylinder for the reciprocating piston 12 disposed within the container. Piston 12 is properly a floating piston in that it normally has equal pressures, or substantially equal pressures, on each face of the piston, when it is in operation.

Figure 4:
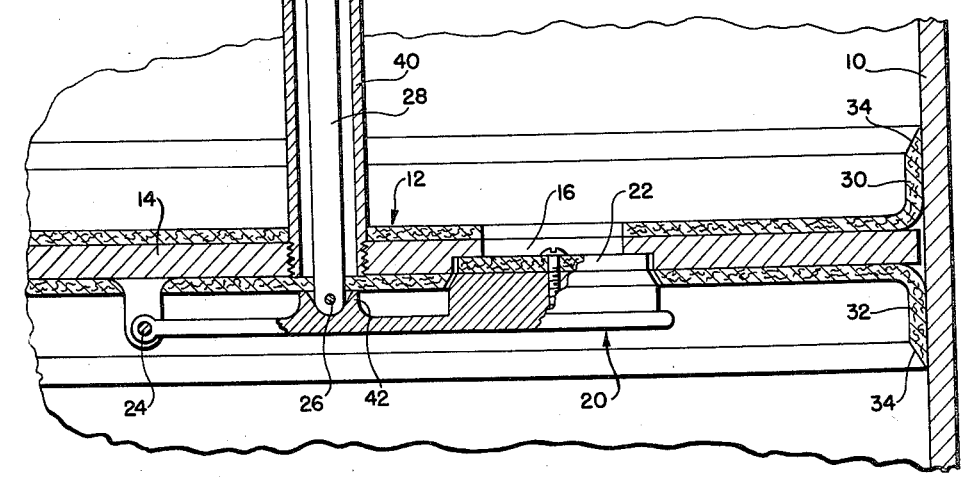
Figure 4 is a fragmentary sectional view on enlarged scale showing a portion of the piston of Figure 3 with all the parts in the same operation position.

Piston 12 is made up preferably of a metal plate 14, which has a through valve opening 16 to form a communicating passageway between the upper and lower faces of the piston when the valve, normally closing the through opening, is in its open position. A by-pass valve 20 is employed normally to close valve opening 16 and this valve is preferably sealed by a fabric or leather disc 22. A convenient form of valve is shown in Figure 4, and provides a pivot 24 and then intermediate its end it is connected to an operation rod 28 by a pin 26. Piston 12 must seal against pressure from both sides because of the its floating arrangement and, to meet these conditions, sealing means must be provided, which will withstand pressure from either face of the piston. A convenient form, in the smaller sizes at least, are cup washers, indicated at 30 and 32. These may be made of various materials although, in the smaller sizes, leather is preferred. Seating means as 30 and 32 are best provided with feathered edges for engaging the wall of container 10 and this has been illustrated in Figure 4 wherein the periphery of the washers are bevelled at 34.

As a means for controlling the position of piston 12 manually and to further provide an indicator to show the position of the piston at all times, I employ a positioning tube 40, which is axially disposed with respect to container 10 and is fixedly secured to the metal plate 14 forming the backbone of the piston assembly. Tube 40 passes up through container 10 and out through a liquid seal packed bearing 44, which employs packing so that the same may be sealed against leakage at this point. At its upper end, tube 40 has, fixedly secured thereto, handle 46, which has a hub portion 48 which forms a convenient coupling to the end of tube 40. Tube 40 is preferably graduated in units of liquid measure. In the smaller sizes, not illustrated, the cylindrical portion of the container may be made of transparent plastic and likewise be graduated in units of liquid measure.

Boss 42 which is provided with a circular upper rim which, when pressed against sealing means 32, effectively seals against any leakage up along rod 28 or into tube 40. Operating rod 28 extends up through the threaded hub portion 48 of handle 46 and terminates in a flat pressure plate 50 which is conveniently disposed with respect to handle 46 so that, as the handle is gripped, pressure can be applied to the end of rod 28. Disposed, between the threaded portion 48 and the head 50, is a compression spring 52. Rod 28 is thus spring biased upwardly and normally seats valve 20 in the recess provided in plate 14 and closing opening 16. When, however, the cycle of operation requires the opening of valve 20, the operator need only press on head 50, compression spring 52, and valve 20 will pivot about its pivot 24 and open the through opening 16.

Referring to Figure 7, a poppet type valve is illustrated at 21, which is attached to the lower end of rod 28 and functions similarly to valve 20, shown generally throughout drawings. A bevelled seat is provided at 23 and water discharge openings 29 are disposed around tube 40 to provide an outlet for water passing between valve 21 and its seat 23. A valve guide 27 is secured to rod 28 and serves as a cylinder valve to close opening 29, when the valve 21 is closed. Longitudinal water passageways are provided at 31.

On one side, container 10 is provided with an upper pipe fitting 60 and a lower pipe fitting 62. The lower fitting accepts the water supply conduit, usually a garden hose 64, which in turn is suitably coupled to a source of water under pressure. The upper fitting 60 is the discharge, which is coupled to a discharge conduit, as pipe 65 and hose 66, which may be in turn supplied with any form of dispensing arrangement. In Figure 1 is illustrated a hand held spray 70 and in Figure 8 a subsurface irrigator 71, both of which are controlled by a spring valve 72.

A cross connection is made between the discharge pipe line coupled to fitting 60 and the supply pipe line coupled to fitting 62. This is normally a pipe line as 74 having at its upper end a suitable manually operated valve 76. This arrangement makes it possible, by opening valve 76 and closing lower valve 78, to employ the input of water through hose 64 and out through hose 66 without passing through the container, which is often desirable particularly when it is desirable to wet down an area prior to fertilizing the same. The discharge line 66 is preferably provided with a shutoff valve 80 so that a manual control of a sprinkler, of the ordinary conventional type, may be in a convenient position for use especially to modify the flow or to shutoff a sprinkler that is already being used.

Container 10 is provided with a lower relief valve 82 and an upper relief valve 84 communicating with the interior of the container. These two valves make it possible to bleed off any air entrapped below or above piston 12 respectively. A preferably threaded filling or charging opening is provided at 86 and supplied with a suitable cap 88.

Referring to Figure 2, the maneuvering handle 46 and the operational end of rod 28, indicated at 50, is illustrated. Handle 46 is provided with lugs 90, which are adapted to engage in the annular groove 92 and to be retractable from this groove through vertical slots as 94. With this arrangement, handle 46 can be pressed downwardly against packing 96 so as to seal the upper end of tube 40 and, at the same time, provide a convenient means for carrying the container and its associated equipment from point to point between periods of use.

Referring to Figures 5 and 6, the various steps of charging the container has been illustrated. In Figure 5, the cap 88 is removed from the filling boss 86 and the piston 12 is in its uppermost position. The piston is held in this position by virtue of the lower portion of the container being filled with water from hose 64. During this operation, it is necessary to close valve 78 and valve 76 so as to prevent the inflow of water under pressure into the lower part of container 10 or to that portion above piston 12 where it would be free to flow out through filling opening 86. With the parts in position of Figure 5 and with valve 80 also closed, a predetermined amount of fertilizer may be introduced through the filling opening 86. This equipment is particularly adaptable to the use of concentrated liquid insecticides and fertilizers. However, it will be readily apparent, it is believed, that concentrated solutions of admixture can be made from any form of material that is water soluble or easily soluble granular or powdered type of admixture may be so introduced.

Figure 3:
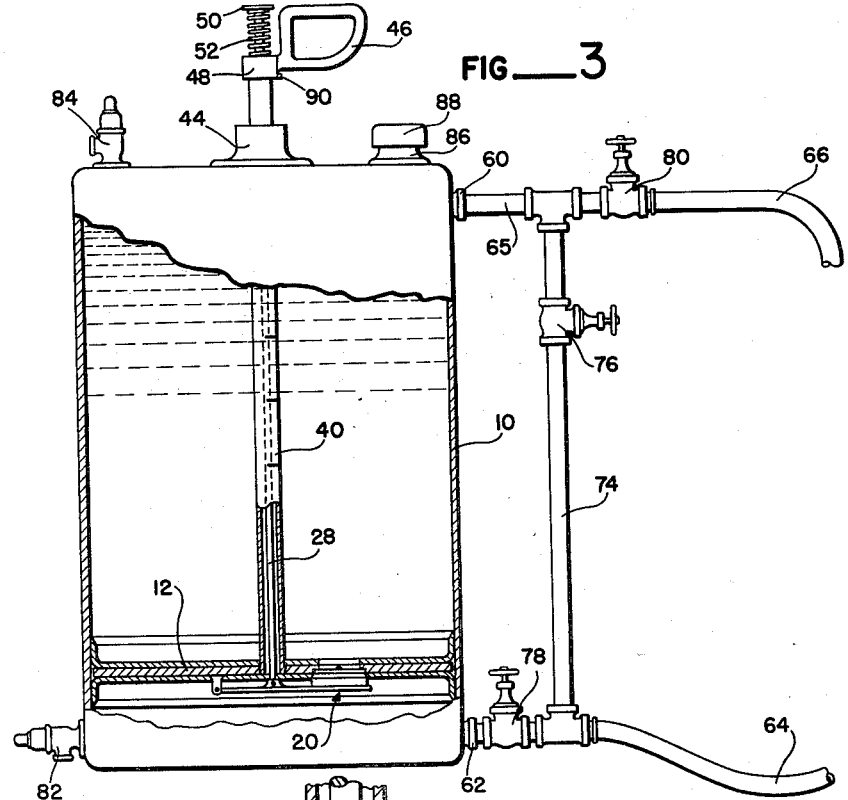
Figure 3 is a side elevation of my dispenser with the dispensing piston in its lower position and with certain of its parts broken away and in section to more fully illustrate the construction.

The next operation is to replace the filler cap 88. It will be noted that handle 46 is elevated to its upper position thus indicating the position of piston 12. At this time, the handle should be gripped with the hand and the thumb pressing downwardly against head plate 50 so as to open valve 20, as is illustrated in Figure 6, or valve 21, as shown in Figure 7. With valve 20 open, the piston can be manually moved downwardly with no resistance other than slight friction because there will be no pressure operation on either side of the piston. During this operation, the flow of water is upwardly through the valve opening and the incoming water will mix with the fertilizer with no opportunity for any of the fertilizer to pass downwardly through opening. When the piston, its lower position as shown in Figure 3, pressure is withdrawn from the operation, rod 28 and spring 52 operate to close valve 20 or valve 21, in the modified form.

To operate the equipment, it is assumed that hose 64 is connected to a source of water under pressure. It is then only necessary to open valves 78 and 80 and to leave valve 76 closed. This will cause water under pressure to come in underneath piston 12 and force it upwardly. At the same time, an equivalent amount of fertilizer bearing water is discharged out through hose 66 to the sprinkling facility. Control of the flow of water can be regulated by either valve 80 or 78.

Valve 76 has a secondary purpose and that is to introduce an increased proportion of water into the already mixed water and fertilizer after it has been discharged from container 10. This is sometimes a matter of great convenience particularly where large areas are to be treated and is is desirable to operate the sprinkler for a considerable period without the necessity of repositioning piston 12. To achieve a slow upward movement of piston 12, valve 78 should be employed. Air vent valves 82 and 84 may be employed at any time to eliminate air that may have been entrapped within container 10.

It is believed that it will be clearly apparent from the above description and the disclosure in the drawings that the invention comprehends a novel construction for a hydraulic dispenser.

Having thus disclosed the invention, I claim:

1. A hydraulic dispenser for water soluble admixtures comprising: a closed pressure container having a substantially cylindrical midbody portion connecting the top and bottom of the container, an axially disposed bearing, a filling opening and threaded openings adjacent the top and adjacent the bottom of said container communicating with the interior of the same; a floating piston disposed for reciprocation within said cylindrical midbody portion; sealing means for said piston adapted to seal against fluid pressure from either face of said piston; said piston having a through valve opening and a valve, operatively secured to said piston, normally biased by a compression spring to close said valve opening; an axially positioned piston positioning tube also serving as an external piston position indicator, secured to said piston and passing out through said bearing and having a handle secured to its outer end; an operating rod, operatively secured to said valve, extending up and out through said positioning tube and adapted to control the positioning of said valve; said compression spring disposed to normally raise said rod and close said valve; a discharge conduit, for admixture bearing water, connected to said upper threaded opening; a water supply conduit connected to said lower threaded opening and a shutoff means therefor; and relief valve means operatively positioned, one above said piston and one below said piston, and communicating with the interior of said container.

2. A hydraulic insecticide and fertilizer dispenser, comprising: a closed pressure container having a substantially cylindrical midbody portion connecting the top and bottom of the container, a filling opening and threaded openings adjacent the top and adjacent the bottom of said container communicating with the interior of the same; a floating piston disposed for reciprocation within said cylindrical midbody portion; sealing means for said piston adapted to seal against fluid pressure from either face of said piston; said piston having a through valve opening and a valve operatively secured to said piston normally biased by a compression spring to close said valve opening; an axially positioned piston positioning tube also serving as an external piston position indicator, secured to said piston and passing out through said packed bearing and having a handle secured to its outer end; an axially disposed bearing secured to said container and having packing therein disposed around said positioning tube and serving as a guide for said tube; an operating rod, secured to said valve, extening up and out through said positioning tube and adapted to control the positioning of said valve; said compression spring disposed to normally raise said rod and close said valve; a discharge conduit for insecticide or fertilizer bearing water connected to said upper threaded opening, and having a shutoff valve spaced away from said container; a water supply conduit connected to said lower threaded opening and having a shutoff valve adjacent said container; and connecting conduit means, exterior of said container connecting said discharge conduit and said supply conduit and valve means for controlling the flow of water through said connecting conduit and relief valves operatively positioned one adjacent the top of said container and one adjacent the bottom of the same and communicating with the interior of said container.

3. The subject matter of claim 2 in which said connecting conduit means comprises, a connecting pipe line joining said discharge and said supply pipe conduits and a supply shutoff valve in said pipe line; said connecting pipe line joining the discharge conduit intermediate said upper threaded fitting and the discharge shutoff valve, and joining said supply pipe line between said discharge shutoff valve and the source of water under pressure.

4. The subject matter of claim 2 in which said axially disposed bearing acts as a guide and bearing for said tube, said bearing having means coacting with means on said handle, to secure said handle in compressing relationship with packing in said bearing, to provide sealing means for said container.

5. The subject matter of claim 2 in which said operating rod has a pressure plate secured at its upper end disposed in a convenient position relative to said handle secured to said positioning tube to permit an operator to operate said positioning tube and said operating rod with one hand at the same time.

No references cited.